United States Patent [19]

Haynes

[11] 4,191,362

[45] Mar. 4, 1980

[54] WELDING TORCH HOLDER

[75] Inventor: John R. Haynes, Tulsa, Okla.

[73] Assignee: Head, Johnson & Chafin, Inc., Tulsa, Okla.

[21] Appl. No.: 951,603

[22] Filed: Oct. 16, 1978

[51] Int. Cl.² .............................................. B23K 7/00
[52] U.S. Cl. ......................................... 266/48; 266/77
[58] Field of Search ........................ 266/77, 48; 148/9

[56] References Cited

U.S. PATENT DOCUMENTS

| 2,519,871 | 8/1950 | Begerow | 266/77 |
| 4,029,301 | 6/1977 | Mighton | 266/77 |

*Primary Examiner*—W. Stallard
*Attorney, Agent, or Firm*—Head & Johnson

[57] ABSTRACT

An improved welding torch holder including a flat longitudinal member having clamping means to hold a welding torch, a block member having an arm to attach to a gantry or welding fixture, the block member having defined internally therein a passageway for slidably receiving the longitudinal member therethrough, means cooperating with said block member and said longitudinal member to provide reciprocation therebetween, a friction bar interposed in said passageway between said longitudinal member and said block member, means carried by the block member to urge the friction bar against one surface of the longitudinal member to cause secure retention of the longitudinal member at any desired position.

4 Claims, 7 Drawing Figures

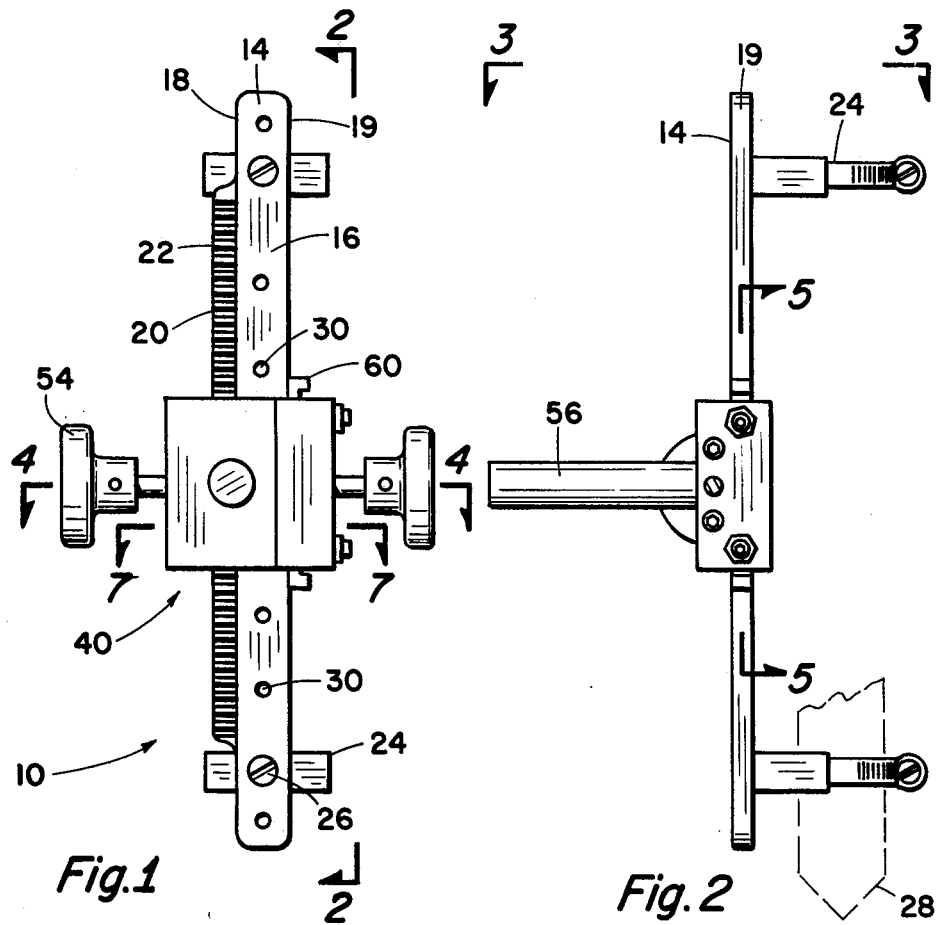
Fig. 1
Fig. 2
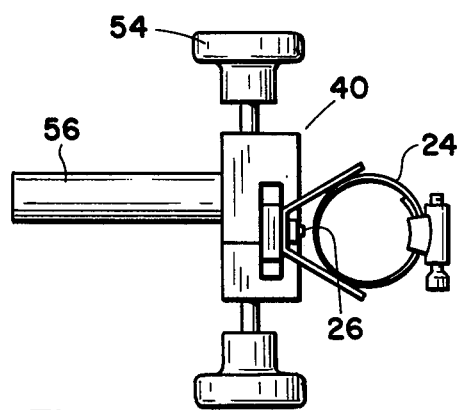
Fig. 3

WELDING TORCH HOLDER

BACKGROUND OF THE INVENTION

This invention lies in the field of welding torch holders.

In using welding torch holders, it is necessary that the torch maintain a fixed position relative to a workpiece. It has been found that in the torch holders in use the weight of the welding torch may cause a drift or slippage of the welding torch from a fixed position producing undesirable results.

Accordingly, it is an object of this invention to provide a welding torch holder which is capable of retaining the torch securely at any fixed position.

These and other advantages and objects of the present invention will be apparent on reference to the drawings attached herewith.

DESCRIPTION OF THE DRAWINGS

FIG. 1 is a frontal elevational view of the welding torch holder embodying the present invention.

FIG. 2 is a side view of the welding torch holder of the present invention viewed along line A—A in FIG. 1.

FIG. 3 is a top view of the torch holder viewed along line 3—3 in FIG. 2.

SUMMARY OF THE INVENTION

Figure 4:
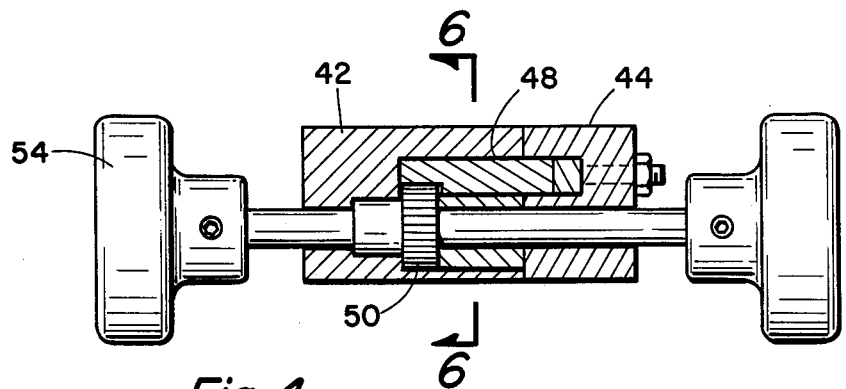
FIG. 4 is a sectional view of the torch holder taken along line 4—4 of FIG. 1 and illustrates the relative configurations of the passageway within the block member, the longitudinal member and the friction bar.

The improved welding torch holder of this invention comprises an assembly of a flat longitudinal member and a friction bar interposed between said longitudinal member and said block member.

The longitudinal member has a flat surface and a first edge and a second edge and clamping means to hold a welding torch securely. A longitudinal toothed rack is attached to the first edge.

The block member is preferably comprised of two body members releasably attached together and having defined internally a passageway for slidably receiving the longitudinal member therein. A toothed wheel, carried by one body member, engages the toothed rack member and permits reciprocation between the longitudinal member and the block member. The block member has a support arm extending outwardly to attach the block member to a gantry or welding fixtures.

The friction bar is contained and confined in the passageway and interposed between said second edge and the second body member. The second body member carries screw means to urge the friction bar against the second edge. The screw means, when tightened, cause the friction bar to rest snugly against the surface of the second edge and the large surface area of contact provides an increased retentive force to hold the portion of the longitudinal member within the passageway securely and thereby holding the welding torch carried by the longitudinal member in a fixed position.

A greater understanding of the working of the present invention can be achieved by reference to the detailed description of the preferred embodiment below.

DESCRIPTION OF THE PREFERRED EMBODIMENT

Turning now to FIG. 1, the welding torch holder of the present invention is generally represented by 10 and comprises a longitudinal member 12, a block member 40, and a friction bar 60 in engaging relationship as will be described more fully hereinbelow.

The longitudinal member 12 comprises, as illustrated, a flat elongated vertical member 14, preferably rectangular in shape and having a longitudinal front surface 16 larger than its edges 18 and 19. At should be noted that while the longitudinal member is described as vertical with respect to the drawings illustrated herein no such limitations should be read into the preferred embodiment. The edge 18 has attached thereto a longitudinal toothed rack member 20 having teeth 22 in substantial alignment with the plane of the front surface 16. The purpose and functions of the rack member 20 will be apparent on further description of the preferred embodiment.

The vertical member 14 is provided with a plurality of clamping means 24 aligned substantially vertically and secured to the vertical member 14 by means such as screws 26. The clamping means 24 are adapted to hold a welding torch 28 securely and stationary with respect to the longitudinal member 12 and may be selectively attached to a plurality of openings 30 provided preferably along the longitudinally vertical axis of the vertical member 14, each opening 30 adapted to receive one screw 26.

Figure 5:
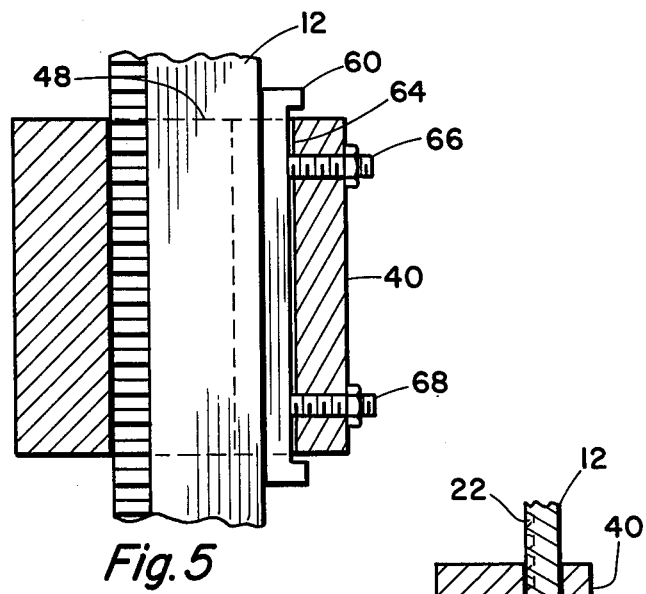
FIG. 5 is a sectional view partly in elevation taken along line 5—5 of FIG. 2 and illustrates friction bar and means to urge the friction bar against the longitudinal member.
Figure 6:
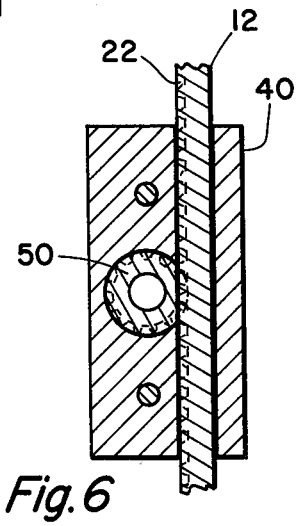
FIG. 6 is a sectional view, partly in elevation, taken along line 6—6 of FIG. 4 and illustrates the toothed wheel-rack teeth engagement to provide reciprocation between the longitudinal member and the block member.
Figure 7:
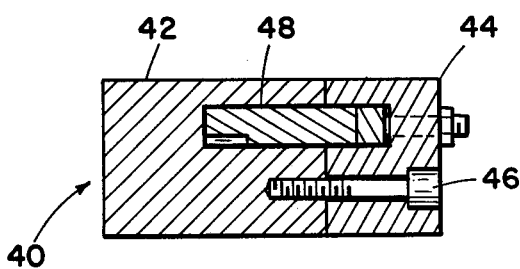
FIG. 7 is a sectional view taken along line 7—7 of FIG. 1 and illustrates the configuration of the first and second body members of the block member.

Turning now to the block member, the block member 40 is illustrated as a preferably rectangular member sleeved over the longitudinal member 12 and comprises, for ease of manufacture and assembly, a first body member 42 releasably attached to a second body member 44 by means such as screws 46 extending through the second body member 44 and secured to the first body member 42 as illustrated in FIG. 7, the two body members together having defined internally therein a vertical longitudinal passageway 48 adapted and configurated to slidably receive the longitudinal member 12 therethrough as illustrated in FIGS. 4, 5 and 6. A toothed wheel 50, having teeth of complementary size and configuration as teeth 22 is situated within the first body member 42 to engage with teeth 22 as shown in FIG. 6 and the operation of the wheel 50 provides reciprocation between the longitudinal member 12 and the block member 40. The wheel 50 is connected to axial rods 52 extending opposingly and perpendicularly therewith beyond the block member 40 to connect to knobs 54, as can be seen in FIG. 4. The knobs 54, of course, permit operation of the wheel 50.

The first body member 42 is provided with a support arm 56 rigidly secured therewith and arising perpendicularly therefrom and directed away from the plane of the front surface 14, as shown in FIG. 2, the support arm 56 serving to attach the block member 40 to a gantry or welding fixtures commonly used and situated at some position relative to a workpiece. Thus, by securing arm 56, the block member 40 will maintain a fixed position and manual operation of the knobs 54 will cause slidable movement of the longitudinal member 12 within the passageway 48.

Turning now to FIG. 5, therein is illustrated the friction means 60 in an operative position, and comprises an elongated member 62 interposed in spaced relation between a portion of the surface of edge 19 and the corresponding vertical longitudinal inner periphery 64 of the second member 44, as illustrated also in FIGS. 1, 4 and 7. The upper and lower end portions of the friction bar 60 are preferably deformed into an L-shape to maintain and restrict the friction bar 60 in its confined position. The friction bar 60 has its one surface of substantially similar shape and configuration as the surface of edge 19 and to provide mating relationship therewith. As can be seen in FIG. 5, means are provided to urge the friction bar 60 against the surface of edge 19, said means comprising, as illustrated, two screws 66 and 68 extending inwardly from the exterior of the second body member 44 and therethrough and having the end portion thereof resting against one surface of the friction bar 60; the screws 66 and 68 preferably aligned substantially vertically and with the vertical axis of the edge 19 and the vertical axis of the friction bar 60. The screws 66 and 68 may be tightened externally and will cause the friction bar 60 to rest snugly against the surface of the edge 19 in a mating relation, the large surface area of contact and friction will provide an increased retentive force to hold portion of the longitudinal member 12 within the block member 40 securely thereby holding the torch 28 carried by the longitudinal member 12 in a fixed position. Although two screws 66 and 68 have been suggested, more or less may be used to perform the stated function and the same result would be achieved.

It can be seen that the welding torch holder described above may be attached to and used in conjunction with commonly used welding gantry or fixtures and equipment. With the operation of the knobs 54, the block 40 may be moved along the length of the longitudinal member 12, if the longitudinal member 12 carrying the torch 28 is maintained in a fixed position relative to a workpiece; or alternatively, the longitudinal member 12 carrying the torch 28 may be moved if the block member 40 is maintained in a fixed position, and at any desired position the welding torch 28 will maintain its fixed position when the screws 66 and 68 are tightened urging the friction bar 60 against the surface of the edge 19.

It will be apparent that the welding torch holder described above provide substantial improvement in holding a welding torch in a fixed position and the improvement suggested by this invention may be adapted to be used with presently existing welding torch holders with some modifications. The torch holder of the invention may also be used in conjunction with the welding torch holder described in my U.S. Pat. No. 3,494,586 and the welding torch oscillator described in my U.S. Pat. No. 3,633,812.

Whereas the present invention has been described in particular relation to the drawings attached hereto, it should be understood that other and further modifications, apart from those shown or suggested herein may be made within the spirit and scope of this invention.

What is claimed is:

1. A welding torch holder comprising:
   a longitudinal flat member having a first longitudinal edge and a second longitudinal edge, a longitudinal toothed rack attached to the first edge, and clamping means to hold a welding torch securely;
   a block member having a first body member and a second body member, the two body members releasably attached together and having an internal passageway for slidably receiving the longitudinal member therethrough, a securing arm extending outwardly from said first body member to attach the block member to a gantry;
   means cooperating with said block member and said rack member to provide reciprocation between said longitudinal member and said block member;
   a friction means situated in said passageway and interposed between said second body member and said second edge;
   means carried by said second body member and operable externally thereof to urge said friction means against said second edge.

2. A welding torch holder as in claim 1 wherein the friction means comprise an elongated bar having one surface in mating relation with the surface of the second edge.

3. A welding torch holder as in claim 1 wherein the means to urge the friction means comprise at least one screw member.

4. A welding torch holder as in claim 2 wherein the friction bar end portions protrude beyond the second body member and said portions are deformed into an L-shape.

* * * * *